United States Patent Office 2,920,993
Patented Jan. 12, 1960

2,920,993

INSECTICIDAL COMPOSITION AND METHOD OF DESTROYING INSECTS

Homer E. Fairchild, Wilmington, Del., assignor to E. I. du Pont de Nemours and Company, Wilmington, Del., a corporation of Delaware No Drawing. Application December 9, 1957
Serial No. 701,316

5 Claims. (Cl. 167—22)

This invention is directed to highly effective insecticidal compositions and methods employing malathion and "Sesoxane."

More particularly, this invention relates to the use of "Sesoxane" as a general synergist for malathion. The result is that the insecticidal activity of malathion is unexpectedly and remarkably increased.

While the art knows that "Sesoxane" synergizes with pyrethrins (see for example, the paper by J. H. Fales, O. F. Bodenstein, and M. Beroza, "Evaluation of 3,4-Methylenedioxyphenyl Acetal as a Synergist for Pyrethrins and Allethrin Against House Flies, Mosquitoes, Cockroaches, and Japanese Beetles," which was presented before the Chemical Specialties Manufacturers Assoc. Meeting in Washington, D.C., December 1956), it has heretofore not been known that "Sesoxane" would synergize with malathion. The reports in the literature indicate that "Sesoxane" would not be expected to synergize with other insecticides, such as 2,2-bis-(p-chlorophenyl)-1,1,1-trichloroethane (see, for example, R. L. Metcalf's book, "Organic Insecticides," page 76, published in 1955 by Interscience Publishers Inc.).

Malathion is the common name for O,O-dimethyl S-(1,2-dicarboethoxyethyl) dithiophosphate or mercaptosuccinic acid, diethyl ester, S-ester with thionophosphoric acid, dimethy ester, which has the structural formula:

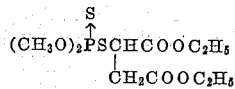

"Sesoxane" is a trademark for 2-(3,4-methylenedioxyphenoxy)-3,6,9-trioxaundecane or acetaldehyde 2-(2-ethoxy-ethoxy) ethyl 3,4-methylenedioxy phenyl acetal, and has the structural formula:

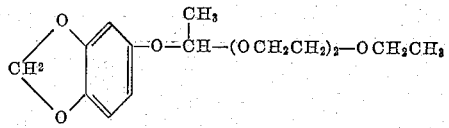

A method for preparing "Sesoxane" is described by M. Beroza in the Journal of Agriculture and Food Chemistry, vol. 4, pages 49–53 (1956).

The terms "insecticide" and "insect" are used herein in their broad common usage and include spiders, mites, nematodes, and the like pests which are not in the strict biological sense classed as insects. Thus, the usage herein conforms to the definitions provided by Congress in Public Law 104, the "Federal Insecticide, Fungicide, and Rodenticide Act" of 1947, Section 2, subsection h, wherein the term "insect" is used to refer not only to those small invertebrate animals belonging mostly to the class Insecta, comprising six-legged, usually-winged forms, as beetles, bugs, bees, flies and so forth, but also to other allied classes of arthropods whose members are wingless and usually have more than six legs, as spiders, mites, ticks, centipedes, wood lice, and the like.

What I mean when I say "Sesoxane" is a general synergist for malathion is that malathion-"Sesoxane" combinations exhibit higher toxicity to insects than either component used alone. This synergistic effect is not peculiar to one, two or a few insects but is generally observed throughout the world of insect life.

In operating in accordance with the present invention, any suitable amount of "Sesoxane" can be employed in combination with malathion to obtain compositions in which malathion is activated by "Sesoxane" because no particular proportion of "Sesoxane" need be admixed with malathion in order to obtain such synergism. The optimum proportions of the active components will vary depending upon the particular insect species to be controlled, the physiological age of the insects, the prevailing climatic conditions, the formulation used, etc. It is impossible, therefore, to state exactly the best proportions to be used in every situation.

While the exact amounts of each component in a given mixture do not appear to be critical, it is preferred to use compositions containing the two compounds admixed together in a ratio of from about 1:2 to 25:1 parts by weight of malathion to "Sesoxane." Still more preferred compositions are those containing the compounds in 1:1 ratio on a weight basis.

The insecticidal mixtures of the invention can be employed by mixing them with conventional pest control adjuvants, modifiers, diluents or conditioning agents, hereinafter called generically inert carriers, to provide compositions in the form of solutions, emulsions, dispersions, powders dispersible in water or other solvent, dusts or the like. Thus, they can be employed with a carrier or diluent agent such as a finely divided solid, a solvent liquid of organic origin, water, a surface active agent, or aqueous emulsion or any suitable combination of one or more of any of these. Such formulations or compositions facilitate handling and application and frequently enhance insecticidal effectiveness.

One advantage accruing from formulation is that synergistic mixtures of malathion and "Sesoxane" can be made to have a lasting residual insecticidal effect.

Another advantage of malathion-"Sesoxane" formulations is the increased knockdown. By knockdown I mean that percentage of insects out of the total number treated with a given insecticide formulation which are immobilized and not capable of walking or flying at a measured time interval after such treatment.

The liquid compositions, whether solutions or dispersions of the active agents in a liquid solvent, and also the wettable powder compositions of the invention, may contain as a conditioning agent one or more surface active agents in amounts sufficient to render the composition readily dispersible in water. By the term surface active agent are included wetting agents, dispersing agents, emulsifying agents and the like.

Suitable surface active agents are set out, for example, in Searle U.S. Patent No. 2,426,417, Todd U.S. Patent No. 2,655,447, or Jones U.S. Patent No. 2,412,510. Particularly good agents are set forth in Linher et al. U.S. Patent No. 2,139,276. A detailed list of such agents is set forth in an article in "Soap and Chemical Specialties," vol. 31, No. 7, pages 50–61; No. 8, pages 48–61; No. 9, pages 52–67 and No. 10, pages 38–67 (1955). See also McCutcheon in "Chemical Industries," November 1947, page 8011, entitled "Synthetic Detergents"; and Bulletin E-607 of the Bureau of Entomology and Plant Quarantine of the U.S. Department of Agriculture. In general less than 10% by weight of surface active agent is present in the compositions containing malathion and "Sesoxane" and usually less than 1% by weight is present.

For the control of insects with malathion-"Sesoxane" mixtures formulated as liquid sprays, aerosols, low-pressure sprays (containing propellants), emulsifiable concentrates, wettable powders and ducts, preferably containing a surface-active agent, the formulations will include from about 0.05 to 95% active ingredient (malathion). Very often preferred formulations will contain from 0.1 to 10% active ingredient.

Particularly useful formulations are those prepared for use as sprays and aerosols including low pressure general, the rate of application of malathion-"Sesoxane" mixtures is from ½ to ⅓ of that which would be used if "Sesoxane" were not present in the formulations. The ratio of "Sesoxane" to malathion has been given above.

Particular use rates that are generally found effective are given in Table I, but it must be understood that the determination of the proper rate in any given instance is conventional procedure to those skilled in the art.

TABLE I

| Crop, Host or Area | Insect | Dosage, Active Malathion | Ratio of Malathion-"Sesoxane" | Method Application |
|---|---|---|---|---|
| Alfalfa | Alfalfa weevil | .1 to 1.5 lb./A | 1:2 to 25:1 | Spray. |
|  | Pea aphid | .05 to 1.0 lb./A | 1:2 to 25:1 | Do. |
| Clover | Clover seed weevil | .5 to 5% | 1:2 to 25:1 | Dust at 20 lb./A. |
| Corn | European corn borer | .1 to 1.5 lb./A | 1:2 to 25:1 | Spray. |
|  |  | 1 to 5% | 1:2 to 25:1 | Dust at 40 lb./A. |
| Beans | Aphids | .5 to 3 lb./A | to 25:1 | Spray. |
| Cabbage | Flea beetles | .1 to 1.25 lb./A | to 25:1 | Do. |
| Apple | Apple maggot | .5 to 2 lb./100 gal. water applied to coverage. | to 25:1 | Do. |
| Rose | Aphids | 1 to 5% applied to coverage | 1:2 to 10:1 | Aerosol. |
| Cotton | Boll weevil | .2 to 3 lb./A | 1:2 to 25:1 | Spray or dust. |
| Cotton | Cotton leafworm | .1 to .5 lb./A | 1:2 to 25:1 | Do. |
| House | Cockroaches | .5 to 5%, 1 pint/125 linear ft. | 1:2 to 10:1 | Spray or paint. |
| Barn | House fly | .2 to 2%, 1 oz./1,000 sq. ft. | 1:2 to 10:1 | In baits. | sprays containing propellants. Typical propellants are trichloromonofluoro methane (a substance sold under the Du Pont trademark "Freon 11") and dichloro-difluoro methane (a substance sold under the Du Pont trademark "Freon 12"). A popular inert carrier for such sprays and aerosols is an odorless petroleum distillate which may perhaps be used to the extent of from about 40 to 95% by weight in such formulations. Compositions intended for use as sprays and aerosols can contain from 0.5 to 5% by weight malthion using ratios of malathion to "Sesoxane" of 1:2 to 10:1.

Powdered or dust compositions of the invention, whether or not also modified with a surface-active dispersing agent, are prepared by admixing the active agents with finely divided solids, preferably talcs, natural clay, pyrophyllite, diatomaceous earth and flours such as wanut shell, wheat, redwood, soya bean and cotton seed flours. Other inert solid carriers which can be used include magnesium and calcium carbonates, calcium phosphates, sulfur, lime, etc., either in powder or granular form.

The percentage by weight of the active agents will vary according to the manner in which the dust composition is to be applied but, in general, can be from about 0.5 to 95% by weight of the insecticideal composition. Preferred dusts will contain from 1 to 10% by weight malathion with ratios of malathion to "Sesoxane" of from 1:2 to 10:1 by weight.

The compositions of the invention can optionally include fungicides such as ferric or zinc dimethyldithiocarbamate, zinc ethylenebis-(dithiocarbamate), manganese ethylenebis-(dithiocarbamate) and N-trichloromethyl thio-4-cyclohexene-1,2-dicarboximide. Also, the compositions can optionally include other insecticides, such as chlordane, dieldrin, aldrin, toxaphene, benzene hexachloride and the like. See for example, U.S. Patent 2,426,417 for other additives.

The rate of application of compositions containing mixtures of malathion and "Sesoxane" will vary with the particular insect pest involved, the formulation used, the mode of application, prevailing atmospheric conditions, and the like. So many variables enter into the subject that it is not possible to state generally a rate suitable for each application situation. However, in general, application rates of from about 0.03 to 10 pounds per treated acre are generally effective for mixtures of malathion with "Sesoxane." When malathion and "Sesoxane" are used in formulations as space sprays, the rate of application will usually vary between from about 4 to 12 milliliters of malathion per 200 cubic feet. In The above applications generally always result in a 100% kill of the insect treated.

In order that the invention may be better understood, the following examples are given in addition to the examples already given above. The examples illustrate typical insecticidal compositions of the invention, methods for their preparation, insecticidal applications and the results obtained. The numbers following the tabulated ingredients represent parts by weight of the ingredients in the respective compositions.

EXAMPLE 1

*Water-dispersible powders*

The following powdered compositions are adopted for dispersing in water for application as a spray for the destruction and prevention of insects. The powdered compositions are made by intimately mixing the listed ingredients using conventional mixing or blending equipment and then grinding the mixture to give a powder having an average particle size less than about 50 microns.

A

| | |
|---|---|
| Malathion | 27.4 |
| "Sesoxane" | 5.0 |
| Alkyl, aryl sodium sulfonate | 0.5 |
| Methyl cellulose | 0.25 |
| Kaolin clay | 44.55 |
| Diatomaceous silica | 22.30 |

This formulation is used to control lice on cattle when applied at the rate of 16 pounds of the above suitable powder composition per 100 gallons of water in a power sprayer operating at 200 pounds per square inch pressure. Preferably the cattle are sprayed for complete coverage to the point of run-off (which is usually about 1 gallon per animal) with the prepared spray solutions for substantially complete control of lice.

B

| | |
|---|---|
| Malathion | 53.7 |
| "Sesoxane" | 5.0 |
| Synthetic fine silica (neutral pH) | 25.0 |
| Kaolin clay | 15.5 |
| Dioctyl sodium sulfosuccinate | 0.5 |
| Methyl cellulose | 0.25 |

This formulation is used for the control of boll weevil when applied at the rate of 1 pound of the above composition per acre. When applied as a spray to infested cotton with thorough coverage, substantial control of the boll weevil is obtained.

EXAMPLE 2

Dust

Compositions of the following type are adopted for direct application as dusts for the destruction or prevention of insects using conventional dusting equipment. The dusts are made by first micropulverizing malathion with a minor diluent and then blending the resulting composition with a major diluent. The resulting composition should have a particle size of about 50 microns. "Sesoxane" is sprayed on during the last blending step.

| | |
|---|---|
| Malathion | 2.0 |
| "Sesoxane" | 1.0 |
| Kaolin clay | 15.0 |
| Pyrophillite | 82.0 |

This formulation is used for the substantially complete control of fleas on pets. Just enough powder is used to give thorough coverage of the necessary body areas. Residual protection for at least one week is ordinarily obtained.

EXAMPLE 3

Emulsifiable concentrate

The following compositions are in liquid form and are adopted for addition to water to give aqueous dispersions for application as sprays. The fluid compositions shown are prepared by thoroughly mixing the active compounds and other agents in an organic liquid diluent.

| | |
|---|---|
| Malathion | 53.7 |
| "Sesoxane" | 10.0 |
| Alkylated naphthalene (principally -methyl naphthalene) | 28.3 |
| Alkyl aryl polyether alcohol | 8.0 |

This formulation is used for the control of plum curculio by preparing an aqueous spray solution with the above emulsifiable concentrate which contains about 0.75 pound of malathion per 100 gallons of water. Substantially complete control of the plum curculio is obtained.

EXAMPLE 4

Bait composition

In this formulation, pulverized malathion is ribbon-blended with the other components until the mix is homogeneous. Particle sizes below about 50 microns are preferred.

| | |
|---|---|
| Malathion | 1.5 |
| "Sesoxane" | 0.5 |
| Granulated sugar | 15.0 |
| Sand | 83.0 |

This composition is adopted for shaker application and is very useful for house fly control in dairy barns. The product is conveniently scattered on the floors and crevices of dairy barns at the rate of about 1 ounce per 1000 square feet.

EXAMPLE 5

Spray formulations

The following composition is adopted for household spray application. The powders are mixed and then blended with the liquids.

A

| | |
|---|---|
| Malathion | 2.0 |
| Methoxychlor | 2.0 |
| "Sesoxane" | 0.5 |
| 20% pyrethrum conc | 0.5 |
| Alkylated naphthalene | 20.0 |
| Odorless petroleum distillate (Deobase) | 74.75 |
| Dodge-Olcott Odorant 4846 | 0.25 |

This formulation is applied as a spray or as a paint to baseboards or thresholds, hidden crevices, cracks and the like at the approximate rate of 1 pint per 125 linear feet. It is generally extremely effective against household insect pests.

B

| | |
|---|---|
| 95% malathion | 2.0 |
| Methoxychlor | 4.0 |
| "Sesoxane" | 0.75 |
| Alkylated naphthalene | 20.0 |
| Odorless petroleum distillate (Deobase) | 73.25 |

This formulation is best used as an outdoor "Flit Gun" type residual spray for use on exterior surfaces such as houses, barns and the like, infested with insects. When sprayed to run-off (full coverage) substantially complete control of insects is obtained.

EXAMPLE 6

Aerosols

A. To prepare a 12 ounce (340 gram) "bomb," 44.5 grams of a concentrate consisting of 32.1 grams of methylene chloride, in which is dissolved 6.8 grams malathion, 0.34 gram "Sesoxane" and 0.846 gram Dodge Olcott Odorant 4846 is metered into the 12 ounce "bomb" container. The container and contents are then cooled to from $-15$ to $-20°$ F. Then 295.5 grams of mixed "Freons" (Du Pont trademark) composed of 50% "Freon 12" and 50% "Freon 11" is metered into the "bomb" can. The can is sealed, equipped with a suitable valve, and allowed to come to room temperature. The "bomb" is ready for use and had the following composition:

| | |
|---|---|
| Malathion | 2.0 |
| "Sesoxane" | 0.1 |
| 20% pyrethrum conc | 1.0 |
| Methylene chloride | 9.75 |
| Freon 11 | 43.45 |
| Freon 12 | 43.45 |
| Dodge-Olcott Odorant 4846 | 0.25 |

This composition can be used for the substantially complete control of flying insects in a room. The entire room is carefully misted and the flies, mosquitoes, and other flying insects which are present in the room are knocked down and killed.

B. To prepare a 12 ounce (340 grams) "bomb," 185 grams of concentrate consisting of 102.8 grams of deodorized kerosene and 68.0 grams of alkylated naphthalene in which are dissolved 13.6 grams malathion and 1.36 grams "Sesoxane" are placed in the "bomb" container. Container and contents are then cooled to from $-15$ to $-20°$ F. Then 155 grams of mixed "Freons" composed of 50% "Freon 12" and 50% "Freon 11" is metered into the "bomb" can. The can is sealed, equipped with a suitable valve and allowed to come to room temperature. The "bomb" is ready for use and has the following composition:

| | |
|---|---|
| Malathion | 4.0 |
| "Sesoxane" | 0.4 |
| Alkylated naphthalene | 20.0 |
| Odorless petroleum distillate | 30.0 |
| Freon 11 | 22.8 |
| Freon 12 | 22.8 |

This spray is used to control aphids on roses by making a thorough application of spray onto plant surfaces. This treatment gives effective control of aphid infestations. This spray can also be applied to give effective control of aphids when applied at the rate of about 1 gram of spray per 2 average size rose bushes.

This application is a continuation-in-part of my application Ser. No. 685,813, filed September 24, 1957.

The claims are:

1. A method for the destruction and prevention of insects which comprises applying to the habitat of the insect a mixture containing 2-(3,4-methylenedioxyphenoxy)-3,6,9-trioxaundecane and malathion.

2. An insecticidal composition comprising a mixture of 2-(3,4-methylenedioxyphenoxy)3,6,9-trioxaundecane and malathion.

3. An insecticidal composition comprising an inert carrier, malathion and 2-(3,4-methylenedioxyphenoxy)-3,6,9-trioxaundecane.

4. An insecticidal composition comprising a surface active agent, malathion and 2-(3,4-methylenedioxyphenoxy)-3,6,9-trioxaundecane.

5. A method for killing insects which comprises applying to insects a mixture containing 2-(3,4-methylenedioxyphenoxy)-3,6,9-trioxaundecane and malathion.

References Cited in the file of this patent
UNITED STATES PATENTS 2,771,390     Williamson _____ Nov. 20, 1956

OTHER REFERENCES

Agr. and Food Chem., vol. 4, No. 1, January 1956, pp. 49–53.

Agr. Chem., February 1957, vol. 12, No. 2, p. 38.